(12) United States Patent
Liu et al.

(10) Patent No.: US 9,872,253 B2
(45) Date of Patent: Jan. 16, 2018

(54) NETWORK SELECTION METHOD, APPARATUS, AND BASE STATION

(71) Applicant: Huawei Technologies Co., Ltd., Shenzhen (CN)

(72) Inventors: Yalin Liu, Shenzhen (CN); Wei Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 87 days.

(21) Appl. No.: 14/859,217

(22) Filed: Sep. 18, 2015

(65) Prior Publication Data

US 2016/0014699 A1 Jan. 14, 2016

Related U.S. Application Data

(63) Continuation of application No. PCT/CN2014/074133, filed on Mar. 26, 2014.

(30) Foreign Application Priority Data

Mar. 26, 2013 (CN) .......................... 2013 1 0100875

(51) Int. Cl.
*H04W 52/02* (2009.01)
*H04W 48/18* (2009.01)
(Continued)

(52) U.S. Cl.
CPC ....... *H04W 52/0258* (2013.01); *H04W 48/18* (2013.01); *H04L 12/5691* (2013.01);
(Continued)

(58) Field of Classification Search
CPC ............. H04W 52/0258; H04W 52/02; H04W 48/00; H04W 48/18; H04W 40/02; H04W 40/08
See application file for complete search history.

(56) References Cited

U.S. PATENT DOCUMENTS 6,748,246 B1 * 6/2004 Khullar ................ H04W 48/18
455/465
6,978,138 B2 12/2005 Japenga et al.
(Continued)

FOREIGN PATENT DOCUMENTS

CN 101207900 A 6/2008
CN 101212391 A 7/2008
(Continued)

OTHER PUBLICATIONS

"Serving cell association in heterogeneous networks," 3GPP TSG-RAN WG1 #54bis, Prague, Czech Republic, R1-083814, 3$^{rd}$ Generation Partnership Project, Valbonne, France (Sep. 29-Oct. 3, 2008).
(Continued)

*Primary Examiner* — Warner Wong
(74) *Attorney, Agent, or Firm* — Leydig, Voit & Mayer, Ltd.

(57) ABSTRACT

Embodiments of the present invention disclose a network selection method, an apparatus and a base station. The method includes: determining each of networks satisfying requirements of a user when the user initiates a service or transmits a service; estimating an average energy efficiency of a system during service transmission after the user selects to access each of the networks; selecting a network which can make the average energy efficiency of the system reach a preset threshold value to serve the user. Embodiments of the present invention solve a problem in the prior art that, because no consideration is given to network energy consumption in the network selection, system energy efficiency is reduced. Through comprehensive consideration of network energy efficiency and system energy efficiency, the need for energy saving and consumption reduction is met.

6 Claims, 4 Drawing Sheets

(51) Int. Cl.
  *H04W 40/02* (2009.01)
  *H04L 12/54* (2013.01)
  *H04W 88/06* (2009.01)
(52) U.S. Cl.
  CPC .......... *H04W 40/02* (2013.01); *H04W 88/06* (2013.01); *Y02B 60/50* (2013.01)

(56) References Cited

U.S. PATENT DOCUMENTS

| | | | |
|---|---|---|---|
| 2009/0068969 A1* | 3/2009 | Lindoff | H04W 48/18 455/161.1 |
| 2012/0166622 A1* | 6/2012 | Draznin | H04W 48/18 709/224 |
| 2012/0282862 A1* | 11/2012 | Wigard | H04W 52/0258 455/67.11 |
| 2013/0023274 A1* | 1/2013 | Meredith | H04W 48/18 455/450 |
| 2013/0260762 A1* | 10/2013 | Tomita | H04W 36/30 455/436 |
| 2014/0185509 A1 | 7/2014 | Choi et al. | |
| 2016/0021546 A1* | 1/2016 | Cuervo | H04W 48/18 370/254 |
| 2016/0073417 A1* | 3/2016 | Sebeni | H04W 48/16 370/329 |

FOREIGN PATENT DOCUMENTS

| | | |
|---|---|---|
| CN | 101686531 A | 3/2010 |
| CN | 101778114 A | 7/2010 |
| CN | 101877829 A | 11/2010 |
| CN | 102158934 A | 8/2011 |
| CN | 102238682 A | 11/2011 |
| CN | 102833832 A | 12/2012 |
| CN | 102917440 A | 2/2013 |
| CN | 102917441 A | 2/2013 |
| WO | WO 2010029354 A1 | 3/2010 |
| WO | WO 2013036047 A2 | 3/2013 |

OTHER PUBLICATIONS

Jorgensen et al., "On the Potentials of Traffic Steering Techniques between HSDPA and LTE," IEEE 73$^{rd}$ Vehicular Technology Conference, Budapest, Hungary, Institute of Electrical and Electronics Engineers, New York, New York (May 15-18, 2011).

"3$^{rd}$ Generation Partnership Project; Technical Specification Group Services and System Aspects; Architecture enhancements for non-3GPP accesses (Release 11)," 3GPP TS 23.402, V11.6.0, pp. 1-252, 3$^{rd}$ Generation Partnership Project, Valbonne, France (Mar. 2013).

"3$^{rd}$ Generation Partnership Project; Technical Specification Group Radio Access Network; Further Advancements for E-UTRA Physical Layer Aspects (Release 9)," 3GPP TR 36.814, V2.0.0, pp. 1-103, 3$^{rd}$ Generation Partnership Project, Valbonne, France (Mar. 2010).

Dong et al., "An integrated LTE/WLAN two-hop-relay architecture for throughput and energy efficiency enhancement," Journal of Graduate University of Chinese Academy of Sciences, vol. 29, Issue 3, pp. 414-422, China (May 2012).

* cited by examiner

NETWORK SELECTION METHOD, APPARATUS, AND BASE STATION

CROSS-REFERENCE TO RELATED APPLICATIONS

This application is a continuation of International Patent Application No. PCT/CN2014/074133, filed on Mar. 26, 2014 which claims priority to Chinese Patent Application No. 201310100875.4, filed on Mar. 26, 2013, both of which are hereby incorporated by reference in their entireties.

TECHNICAL FIELD

The present invention relates to a communication network and, in particular, to a network selection method, an apparatus, and a base station.

BACKGROUND

With the development of wireless network technology, as well as the popularity of multi-mode terminals, different service shunting solutions are proposed by users from the standpoints such as network capacity, traffic load and throughput and so on, so that the users can perform a network selection better. But all these solutions do not consider the problem of the network selection from the standpoint of energy efficiency. Therefore, how to reduce energy consumption of the network, and how to improve energy efficiency of a system are problems that urgently needed to solve.

In order to solve these problems, the following several technical solutions are provided in the prior art:

One technical solution is: two user-centered network selection solutions are disclosed. Wherein one network selection is: when initiating a service, obtaining network performance requirements corresponding to the service; based on the obtained network performance requirements and network performances of various networks that the multi-mode terminal supports, selecting a network providing the service from the various networks. Another network selection is: when a user initiates a service or a service is transmitted, obtaining the network performance requirements corresponding to the service; extracting network selection tendency information corresponding to the service which is previously stored; based on the obtained network performance requirements, the network performances of various networks that the multi-mode terminal supports, and the extracted network selection tendency information, selecting the network providing the service from the various networks.

Although the two network selection solutions in the prior art enable the multi-mode terminal to combine the service and the characteristics of network to select the appropriate network to access, and improve the performance of end-to-end service systems. However, the two solutions do not consider the energy consumption of the network when performing the network selection. Especially after the network performance changes, the network will be reselected, thereby causing a frequent handover of the user.

Another solution is: a network selection solution based on terminal energy saving. In this technical solution, the user selects a desired operating mode, the networks which can be accessed, and the system parameters and access conditions of these networks are obtained, the energy consumption required for accessing each network is estimated, a network which makes the user most energy-efficient is selected, then service is initiated in the selected network.

It can be seen from the network selection technical solution based on terminal energy saving that, when performing the network selection, the energy saving of the multi-mode terminal is considered, while the energy consumption of the network is not considered. Although the requirements of multi-mode terminal is met, the requirements of energy saving and consumption reduction of the operators cannot be met.

Thus, in the study and practice of the prior art, the inventors of the present invention have found that, in all the existing network selection solutions, the energy consumption of the network is not considered, the energy efficiency of the entire system is reduced, and the growing requirements of energy saving of the operators is not met.

SUMMARY

Embodiments of the present invention provide a network selection method, an apparatus, and a base station, to solve the problem that, in a network selection, energy efficiency of a system is reduced since energy consumption of the network is not considered.

In order to solve the above problem, embodiments of the present invention disclose technical solutions as follows:

A first aspect provides a network selection method, which includes:

determining each of networks satisfying requirements of a user, when the user initiates a service or transmits a service;

estimating an average energy efficiency of a system during service transmission, after the user selects to access each of the networks; and selecting a network which can make the average energy efficiency of the system reach a preset threshold value to serve the user.

In a first possible implementation according to the first aspect, the selecting the network which can make the average energy efficiency of the system reach the preset threshold value to serve the user includes:

if the user is in a network of which the average energy efficiency reaches the preset threshold value, then using the network of which the average energy efficiency reaches the preset threshold value to transmit the service of the user.

In a second possible implementation combining the first aspect or the first possible implementation of the first aspect, the selecting the network which can make the average energy efficiency of the system reach the preset threshold value to serve the user includes:

if the user is not in a network of which the average energy efficiency reaches the preset threshold value, then notifying the user of a handover into the network of which the average energy efficiency reaches the preset threshold value, and after the handover of the user into the network of which the average energy efficiency reaches the preset threshold value is completed, using the network of which the average energy efficiency reaches the preset threshold value to transmit the service of the user.

In a third possible implementation combining the first aspect or the first or the second possible implementation of the first aspect, the estimating the average energy efficiency of the system during the service transmission, after the user selects to access each of the networks includes:

estimating the average energy efficiency of system during the service transmission after the user selects to access each of the networks through a method of system energy efficiency prediction or network energy efficiency prediction.

In a fourth possible implementation combining the first aspect or the first or the second or the third possible implementation of the first aspect, the estimating the average energy efficiency of the system during the service transmission after the user selects to access each of the networks based on the method of system energy efficiency prediction includes:

obtaining a throughput and power information of each network in each transmission time interval (TTI);

selecting the throughput and power information during a first transmission time period, the first transmission time period comprises at least one TTI;

estimating a throughput and power information of each network during a second transmission time period of the user, according to the selected throughput and power information; and calculating respectively the average energy efficiency of the service transmission of the system in the second transmission time period of the user after the user selects to access each of the networks, according to the estimated the throughput and power information.

In a fifth possible implementation combining the first aspect or the first or the second or the third or the fourth possible implementation of the first aspect, the estimating the average energy efficiency of the system during the service transmission after the user selects to access each of the networks based on the method of network energy efficiency prediction includes:

obtaining a signal to interference plus noise ratio of the user, and a load of each network;

searching in a preset network energy efficiency table according to the signal to interference plus noise ratio of the user, and the load of each network, to get the energy efficiency of each network; and calculating the average energy efficiency of the system during the service transmission after the user selects to access each of the networks of which the energy efficiency is the highest or relatively higher.

A second aspect provides a network selection apparatus, which includes:

a determining unit, configured to determine each of networks satisfying requirements of a user when the user initiates a service or transmits a service;

an estimating unit, configured to estimate an average energy efficiency of a system during service transmission, after the user selects to access each of the networks;

a selecting unit, configured to select a network which can make the average energy efficiency of the system reach a preset threshold value to serve the user.

In a first possible implementation according to the second aspect, the selecting unit includes:

a judging unit, configured to judge whether the user is in the network of which the average energy efficiency reaches the preset threshold value;

a first transmitting unit, configured to use the network of which the average energy efficiency reaches the preset threshold value to transmit the service of the user, after the judging unit judges that the user is in the network of which the average energy efficiency reaches the preset threshold value.

In a second possible implementation combining the second aspect or the first possible implementation of the second aspect, the selecting unit includes:

a notification unit, configured to notify the user of a handover into the network of which the average energy efficiency reaches the preset threshold value, after the judging unit judges that the user is not in the network of which the average energy efficiency reaches the preset threshold value;

a second transmitting unit, configured to use the network of which the average energy efficiency reaches the preset threshold value to transmit the service of the user, after the handover of the user into the network of which the average energy efficiency reaches the preset threshold value is completed.

In a third possible implementation combining the second aspect or the first or the second possible implementation of the second aspect, the estimating unit specifically estimates the average energy efficiency of the system during the service transmission after the user accesses each of the networks through a method of system energy efficiency prediction or network energy efficiency prediction.

In a fourth possible implementation combining the second aspect or the first or the second or the third possible implementation of the second aspect, if the estimating unit estimates the average energy efficiency of the system during the service transmission after the user accesses each of the networks through the method of system energy efficiency prediction, the estimating unit includes:

an information obtaining unit, configured to obtain a throughput and power information of each network in each transmission time interval (TTI);

an information selecting unit, configured to select the throughput and power information during a first transmission time period;

an information estimating unit, configured to estimate a throughput and power information of each network during a second transmission time period of the user, according to the selected throughput and power information;

a first calculating unit, configured to calculate respectively the average energy efficiency of the service transmission of the system in the second transmission period of the user after the user selects to access each of the networks, according to the throughput and power information estimated by the information estimating unit.

In a fifth possible implementation combining the second aspect or the first or the second or the third or the fourth possible implementation of the second aspect, if the estimating unit estimates the average energy efficiency of the system during the service transmission after the user selects to access each of the networks through the method of network energy efficiency prediction, the estimating unit includes:

a second obtaining unit, configured to obtain a signal to interference plus noise ratio of the user, and a load of each network;

a searching unit, configured to search in a preset network energy efficiency table according to the signal to interference plus noise ratio of the user, and the load of each network, to get the energy efficiency of each network;

a second calculating unit, configured to calculate the average energy efficiency of the system during the service transmission after the user selects to access each of the networks of which the energy efficiency is the highest or relatively higher.

A third aspect provides a base station, which includes:

a processor, configured to determine each of networks satisfying requirements of a user when the user initiates a service or transmits a service; estimate an average energy efficiency of a system during the service transmission, after the user selects to access each of the networks; and select a network which can make the average energy efficiency of the system reach a preset threshold value to serve the user.

In a first possible implementation according to the third aspect, the processor is further configured to judge whether the user is in the network of which the average energy efficiency reaches the preset threshold value, the base station further includes:

a transceiver, configured to use the network of which the average energy efficiency reaches the preset threshold value to transmit the service of the user, after the processor judges that the user is in the network of which the average energy efficiency reaches the preset threshold value; or notify the user of a handover into the network of which the average energy efficiency reaches the preset threshold value, after the processor judges that the user is not in the network of which the average energy efficiency reaches the preset threshold value, and after the handover of the user into the network of which the average energy efficiency reaches the preset threshold value is completed, use the network of which the average energy efficiency reaches the preset threshold value to transmit the service of the user.

In a second possible implementation combining the third aspect or the first possible implementation of the third aspect, the processer estimates the average energy efficiency of the system during the service transmission after the user selects to access each of the networks through a method of system energy efficiency prediction or network energy efficiency prediction.

In a third possible implementation combining the third aspect or the first or the second possible implementation of the third aspect, the processer estimates the average energy efficiency of the system during the service transmission after the user selects to access each of the networks through the method of system energy efficiency prediction, includes:

obtains the throughput and power information of each network in each transmission time interval (TTI); selects the throughput and power information during a first transmission time period; estimates a throughput and power information of each network during a second transmission time period of the user, according to the selected throughput and power information; calculates respectively the average energy efficiency of the system in the second transmission time period of the user after the user selects each of the networks, according to the estimated the throughput and power information.

In a fourth possible implementation combining the third aspect or the first or the second or the third possible implementation of the third aspect, the transceiver is further configured to obtain a signal to interference plus noise ratio of the user, and a load of each network;

the processer estimates the average energy efficiency of the system during the service transmission after the user selects to access each of the networks through the method of network energy efficiency prediction, includes:

the processer searches in a preset network energy efficiency table according to the signal to interference plus noise ratio of the user, and the load of each network, to get the energy efficiency of each network; calculates the average energy efficiency of the system during the service transmission after the user selects to access each of the networks of which the energy efficiency is the highest or relatively higher.

It can be seen from the above technical solutions, in the embodiments of the present invention, the energy efficiency of the system (referred to as energy efficiency) is taken as one of the bases of network selection, the networks that meet the requirements of the user are determined, and the average energy efficiency of the system during the service transmission after the user accesses each of the networks is estimated, and the network of which the average energy efficiency is the highest or higher is selected to serve the user. The network energy efficiency and the system energy efficiency are comprehensively taken into consideration, so that the needs for energy saving and consumption reduction is met. In other words, compared with prior art, under the premise of meeting the current requirements of the user, the network of which the average energy efficiency of the system reaches a preset threshold value may be selected to serve the user, thus ensuring the QoS of the user, while improving the energy efficiency of the system. That is, the network energy efficiency and the system energy efficiency are comprehensively taken into consideration, so that the needs for energy saving and consumption reduction is met.

BRIEF DESCRIPTION OF DRAWINGS

To describe the technical solutions in embodiments of the present invention or in the prior art more clearly, the following briefly introduces the accompanying drawings used in the embodiments. Apparently, the accompanying drawings in the following description illustrate merely some embodiments of the present invention, and persons of ordinary skill in the art may still derive other drawings from these accompanying drawings without creative effort.

DESCRIPTION OF EMBODIMENTS

The following clearly and comprehensively describes the technical solutions in embodiments of the present invention with reference to the accompanying drawings in the embodiments of the present invention. Apparently, the described embodiments are merely a part rather than all embodiments of the present invention. All other embodiments obtained by persons of ordinary skill in the art based on the embodiments of the present invention without creative effort shall fall within the protection scope of the present invention.

In a current mobile communication system, under general circumstances, UMTS and LTE coexist, (of course, it may also be another communication system where multi-mode networks coexist, which is not limited in the embodiment). Also, dual-mode terminal which supports UMTS/is increasing, and the user's need for green energy-saving is also increasing. In this situation, embodiments of the present invention provide a network selection method and an apparatus based on energy efficiency. In this method and apparatus, the energy efficiency of the system is taken as one of the bases of network selection, respective networks which meet the requirements of the user are selected (any network as long as it meets the requirements of the user will be selected), after the user accesses each of the networks respectively, average energy efficiency of a system during service transmission is estimated (such as using a system energy efficiency prediction method based on current information and/or past information, or a network energy efficiency prediction method based on historic law, and so on), and the user is enabled to select the network which can make the system reach high energy efficient, thus the purpose of energy saving is achieved.

In the embodiments of the present invention, a UE which supports UMTS/LTE dual-mode is taken as an example, but the UE can receive a service only from one radio access technology (RAT, Radio Access Technology) at one time. Firstly the system selects an appropriate network for the UE, then the UE participates in the single mode scheduling of the selected network, at last the system allocates resources of the selected network to the UE. In the embodiments of the present invention, the influence of the energy efficiency (referred to as energy efficiency) is taken into consideration in the process of network selection, that is, the selection is performed according to the energy efficiency of the system, that is, the network which can make the energy efficiency of the system reach a preset threshold value (such as the highest or the relatively higher) is selected to serve the user. About the specific implementation process, please refer to the following embodiments.

Figure 1:
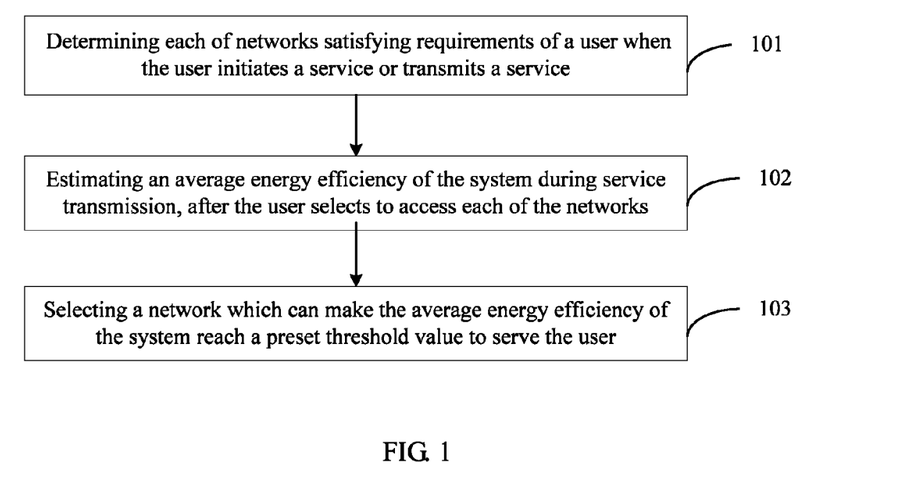
FIG. 1 is a schematic flowchart of a network selection method provided by embodiments of the present invention.

Referring to FIG. 1, FIG. 1 is a schematic flowchart of a network selection method provided by embodiments of the present invention. The method includes:

Step 101: determining each of networks satisfying requirements of a user when the user initiates a service or transmits a service.

When the user initiates the service or transmits the service, a device on a network side (such as a base station) may firstly obtain user information. The user information includes: quality of service, QoS, requirements, may also include a location of the user and/or a service type, but not limited thereto, and may also adaptively include other parameters. The QoS requirements may include: rate requirements and/or delay constraints, but is not limited thereto, and may also adaptively include other parameters, such as bandwidth requirements, and so on.

After that, the base station judges which network among the networks running in the system meets the requirements of the user according to the user information, and selects the network which meets the requirements of the user. That is, from the various networks running in the system, the network which meets the quality of service, QoS, requirements is found. Further, the network which meets the quality of service, as well as the location of user and/or service type may also be found. Where, the network which meets the requirements of the user may be one network, and may also be multiple networks, which will not be limited in this embodiment. For example, LTE and UMTS and the like are all the networks which meet the requirements of the user.

Step 102: Estimating an average energy efficiency of the system during service transmission, after the user selects to access each of the networks.

In this embodiment, the method for estimating average energy efficiency of the system is described in the following two forms as examples, but is not limited thereto:

One is using a system energy efficiency prediction method based on current information and/or past information to estimate the average energy efficiency of the system during the service transmission, which includes:

an apparatus on the network side firstly obtains a throughput and power information of each network in each transmission time interval (TTI); then selects the throughput and power information during a first transmission time period (a period of time which is arbitrarily set according to the requirement); next, estimates a throughput and power information of each network during a second transmission time period of the user, according to the selected throughput and power information; and calculates respectively the average energy efficiency of the service transmission of the system in the second transmission time period of the user after the user selects each of the networks, according to the estimated throughput and power information.

Estimating the throughput and power information of the network may use a complex algorithm to perform the estimation, such as estimating by ARMA—autoregressive moving average model; may also estimate through a simple way, that is, using the throughput and power of the current network to get the throughput and power information of the current network, or obtaining the average value of throughput and power of a recent period of time, and taking this average value as the estimated throughput and power information of the network; or estimating the throughput and power of next stage through linear prediction. Of course, it is not limited to the methods described herein, and may also include other method.

The method of calculating the average energy efficiency of the service transmission of the system in the second transmission time period of the user may be: dividing a sum of the throughputs of the service transmission of respective systems in the second transmission time period by a sum of the power of the service transmission of respective systems in the second transmission time period, then the average energy efficiency of the service transmission in the second transmission time period of the user may be obtained.

For example: taking the running LTE and UMTS satisfying the requirements of the user information in the system as an example, the formula for calculating the average energy efficiency is, but not limited to:

average energy efficiency (EE_total)=(throughput of LTE, Throughput_LTE+throughput of UMTS, Throughput_UMTS)/(power of LTE, Power_LTE+power of UMTS, Power_UMTS).

Figure 2:
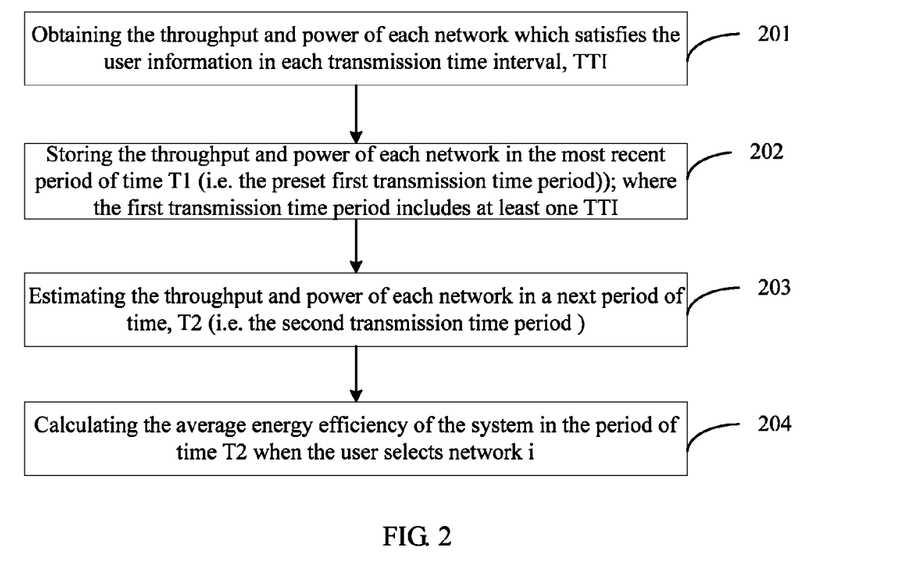
FIG. 2 is a flowchart of a method for estimating average energy efficiency of the system provided in FIG. 1.

The flowchart of this method of estimating the average energy efficiency of the system is shown in FIG. 2. FIG. 2 is a flowchart for estimating the average energy efficiency of the system provided in FIG. 1.

The other is estimating the average energy efficiency of the system by a network energy efficiency prediction method based on historic law, which includes: before calculating, previously setting a current network energy efficiency table in the device in the network side. The contents included in the network storage table include: a correspondence among a signal to interference plus noise ratio of the user, a load of each network, and average energy efficiencies corresponding to each of the networks.

The process thereof includes: firstly obtaining the signal to interference plus noise ratio of the user, and the load of each of the networks (that is the networks which satisfy the requirements of the user), then, searching in a preset network energy efficiency table according to the obtained signal to interference plus noise ratio of the user, and the obtained load of each network, to get the energy efficiency of each network.

On the network side, contents of the preset network energy efficiency table (may also be referred to as a database) include: data like the signal to interference plus noise ratio of the user, the load of each network and the energy efficiencies of the networks serving the user. The device on the network side may search in the preset network energy efficiency table according to the obtained signal to interference plus noise ratio of the user and the obtained current load of each network, to get the energy efficiency corresponding to each network, and the average energy efficiency of the system during the service transmission is calculated after the user selects to access each of the networks of which the energy efficiency is the highest or relatively higher.

The network energy efficiency table is set according to historical statistics of the current cell. For example, when SINR=x dB, the table of historical statistics information is shown in Table 1, where Table 1 is the network energy efficiencies under different loads (SINR=x dB), and Table 1 takes UMTS/LTE as an example, but not limited thereto:

TABLE 1

| UMTS/LTE Load | <10% | 10~30% | 30~50% | 50~70% | >70% |
|---|---|---|---|---|---|
| <10% | EE_U/EE_L | EE_U/EE_L | EE_U/EE_L | EE_U/EE_L | EE_U/EE_L |
| 10~30% | EE_U/EE_L | EE_U/EE_L | EE_U/EE_L | EE_U/EE_L | EE_U/EE_L |
| 30~50% | EE_U/EE_L | EE_U/EE_L | EE_U/EE_L | EE_U/EE_L | EE_U/EE_L |
| 50~70% | EE_U/EE_L | EE_U/EE_L | EE_U/EE_L | EE_U/EE_L | EE_U/EE_L |
| 70~90% | EE_U/EE_L | EE_U/EE_L | EE_U/EE_L | EE_U/EE_L | EE_U/EE_L |
| >90% | EE_U/EE_L | EE_U/EE_L | EE_U/EE_L | EE_U/EE_L | EE_U/EE_L |

Of course, in the above embodiment, the user equipment may also search the corresponding energy efficiency according to its signal to interference plus noise ratio and the current loads of the networks, and select a network with high energy efficiency to access.

It should be noted that the network energy efficiencies under different loads (i.e., network energy efficiency table) may be stored on the user equipment side, may also be stored on the network side, and may also be stored on the user equipment side and the network side at the same time, which will not be limited in the present embodiment.

Step 103: Selecting a network which can make the average energy efficiency of the system reach a preset threshold value to serve the user.

In other words, in this step, firstly the average energy efficiencies of the system during the service transmission of respective networks are compared, to get the highest or a relatively higher average energy efficiency of the system; then the network (i.e. a high energy efficient network) which can make the average energy efficiency of the system reach the preset threshold value is selected and assigned to the user, so as to serve the user, such as transmitting a service and the like.

The preset threshold value is preset according to an empirical value, and may also be a value dynamically adjusted based on the system; includes: a maximum or a relatively higher value that the average energy efficiency of the system can reach.

In the embodiment of the present invention, the energy efficiency of the system (referred to as energy efficiency) is taken as one of the bases of network selection, the networks that meet the requirements of the user are determined, and average energy efficiencies of the system during the service transmission after the user accesses different the networks is estimated, and the network of which the average energy efficiency is high is selected to serve the user. The network energy efficiency and the system energy efficiency are comprehensively taken into consideration, so as to meet the needs for energy saving and consumption reduction.

In other words, compared with the prior art, under the premise of meeting the current requirements of the user, the embodiment of the present invention can select the network of which the average energy efficiency of the system reaches a preset threshold value to serve the user, thus ensuring the QoS of the user, while improving the energy efficiency of the system. Especially after the network is selected, during the service transmission, there will be no initiative network selection. The network energy efficiency and the system energy efficiency are comprehensively taken into consideration, so that the needs for energy saving and consumption reduction is met.

Optionally, in another embodiment, this embodiment is based on the above-described embodiment. The method may further include that: a device on the network side (such as a base station) determines whether the user is in the network of which the average energy efficiency reaches the preset threshold value, if yes, then the network of which the average energy efficiency reaches the preset threshold value is used to transmit the service of the user; otherwise, the device on the network side notifies the user of a handover into the network of which the average energy efficiency reaches the preset threshold value, and after the handover of the user into the network of which the average energy efficiency reaches the preset threshold value is completed, the device on the network side uses the network of which the average energy efficiency reaches the preset threshold value to transmit the service of the user.

In this embodiment, when the network of which the average energy efficiency of the system reaches the preset threshold value is selected to serve the user, it is firstly judged whether the user is currently in the network of which the average energy efficiency reaches the preset threshold value. For the user which is not in the network currently, the user is notified of the handover into the network, then uses the network to transmit the service for the user, thereby the efficiency of service transmission is improved.

Referring to FIG. 2, which is a flowchart of a method for estimating average energy efficiency of the system provided in FIG. 1, and the method includes:

Step 201: Obtaining the throughput and power of each network which satisfies the user information in each transmission time interval (TTI).

Step 202: Storing the throughput and power of each network in the most recent period of time T1 (i.e. the preset first transmission time period); where the first transmission time period includes at least one TTI.

T1 may be set freely according to the law of service changing in the coverage area of the base station, for example is set to be 10 ms, 1 s and so on.

Step 203: Estimating the throughput and power of each network in a next period of time, T2 (i.e. the second transmission time period).

T2 is an estimated service transmission time of the user. For example, according to 3GPP 36.814, it may be assumed that the transmission time of the FTP traffic model 2 service is 5 s, i.e., the second transmission time period may be set to be 5 s, but it is not limited thereto, the transmission time may also be adaptively amended as needed.

In this embodiment, the throughput and power of each network may be estimated by using the complex algorithm, such as estimated by the ARMA—autoregressive moving average model; may also simply use the throughput and power of the current network, or calculating the average value according to the throughput and power of a recent period of time, T1, or estimating the throughput and power of next period (i.e. T2) through linear prediction.

Step 204: Calculating the average energy efficiency of the system in the period of time T2 when the user selects network i.

One of the calculation formulas is: average energy efficiency (EE_total)=(throughput of LTE, Throughput_LTE+ throughput of UMTS, Throughput_UMTS)/(power of the base station of LTE, Power_LTE+power of the base station of UMTS, Power_UMTS).

In this embodiment, the network i takes LTE and UMTS as an example, but it will be not limited to this.

This embodiment takes the throughput and power of the base station of LTE as an example, and the calculation of UMTS is similar, which will not be repeated herein.

The calculation for the throughput in LTE: from bandwidth (Bandwidth)→Number of Resource Block (Number of Resource Block)→Number of Symbol (Number of Symbol)→Modulation type (Modulation type)→Number of bits (Number of bits)→input output (MIMO) factor→normalized to bit (bps), obtaining the throughput. For example: in the LTE FDD system: Bandwidth=20 MHz, Modulation type=64 QAM, Code rate=¾, MIMO=2*2, it can be obtained that, the bit rate with full load is as follows:

Number of Resource Block=100
Number of Resource Element in one sub-frame (1 ms)=100*12*14
Bit rate=100*12*14*6*¾*2*1000*80%=120.96 Mbps
80% represents the proportion of data RE in the total RE.

The power of the base station of LTE: according to 3GPP TS36.814, when the system bandwidth of LTE is 1.25 MHz, 5 MHz, the total transmission power of the base station is 43 dBm; when the system bandwidth is 10 MHz, 20 MHz, the total transmission power of the base station is 46 dBm or 49 dBm; when the system bandwidth is 60 MHz, 80 MHz, or higher, the total transmission power of the base station is 49 dBm.

The formula for calculating path loss is: free space path loss=32.5+20 log 10(f)+20 log 10(d), where f is in MHz and d is in km, and the calculation result is given in dB.

The conversion relationship between dB, dBm and common value is as follows: y dB=10 log(x), y dBm=10 log(1000x)

The correspondences between the commonly used values of dBm and values of power are: 43 dBm=19.95 w; 46 dBm=39.81 w; 49 dBm=79.43 w.

The widely used distributed base station (BTS, Base Transceiver Station) mainly consists of a base band unit (BBU, Base Band Unit) and a radio remote unit (RRU, Radio Remote Unit), of which the power is calculated as follows:

$$P_{BTS} = \sum_{i=1}^{M} P_{BBU_i} + \sum_{j=1}^{N} P_{RRU_j} + P_{overhead} = \sum_{i=1}^{M} P_{BBU_i} + \sum_{j=1}^{N} \frac{P_{static}^{RRU_j} + \sum_{k=1}^{AN_j} \frac{P_{out_k}^{RRU_j}}{\alpha(P_{out_k}^{RRU_j})}}{\eta_{DCDC}^{RRU_j}} + P_{overhead} \quad (1)$$

In this formula, M, N respectively represent the number of BBU, and the number of RRU; $P_{BBU_i}$, $P_{RRU_j}$, $P_{overhead}$ respectively represent the power of the i-th BBU, the power of the j-th RRU, the power of the rest part of the base station or is also called as additional overhead. $AN_j$ represents the number of antennas on the j-th RRU; $P_{static}^{RRU_j}$, $\eta_{DCDC}^{RRU_j}$, $P_{out_k}^{RRU_j}$ respectively represent the static power of the j-th RRU, the direct-current power conversion efficiency of the j-th RRU, and the output power of the k-th antenna on the j-th RRU; $\alpha(P_{out_k}^{RRU_j})$ represents the efficiency of the power amplifier corresponding to the k-th antenna on the j-th RRU when the output power is $P_{out_k}^{RRU_j}$; and if a base station has one BBU and three RRUs, each RRU has 2 antennas, i.e.: M=1, N=3, $AN_j$=2,j=1,2,3.

For example, at a certain service amount, the power consumption data for each component is as follows:
$P_{BBU_1}$=100 watt: the power of BBU is 100 W;
$P_{overhead}$=50 watt: the power of the rest part of the base station is 50 W;
$P_{static}^{RRU_j}$=80 watt, j=1,2,3: the static power of each RRU is 80 W;
$\eta_{DCDC}^{RRU_j}$=0.9, j=1,2,3: the direct-current power conversion efficiency of each RRU is 90%;
$P_{out_k}^{RRU_j}$=15 watt, j=1,2,3; k=1,2: the output power of every antenna on each RRU is 15 W;
$\alpha(P_{out_k}^{RRU_j})$=0.3, j=1,2,3; k=1,2: the efficiency of the power amplifier corresponding to every antenna on each RRU when the output power is 15 W is 30%;

Then according to formula (1), it can be obtained that at this service amount, the power of the base station is:

$$P_{BTS} = P_{BBU_1} + \sum_{j=1}^{3} \frac{P_{static}^{RRU_j} + \sum_{k=1}^{2} \frac{P_{out_k}^{RRU_j}}{\alpha(P_{out_k}^{RRU_j})}}{\eta_{DCDC}^{RRU_j}} + P_{overhead} = 100 + \sum_{j=1}^{3} \frac{80 + \sum_{k=1}^{2} \frac{15}{0.3}}{0.9} + 50 = 750 \text{ watt} \quad (2)$$

Load rate: load rate is a ratio of the network resources occupied by the user to the total resources of the system in the network system, reflects the situation that the service load occupies various network resources, and represents the network congestion status. The larger the load rate is, the smaller the ratio of available network resources to the total resources of the system is, and vice versa. Load rate=the current power of the base station/the maximum power of the base station*100%. When the system is at full load, the load rate reaches 1, and in this case the network enters an unstable state, that is, a saturated state.

In addition, in the case that the power is known, by calculating SINR, RB number, and deriving an MCS according to the SINR→MCS mapping table, the rate which the user can reach is further calculated, and it can be determined whether the requirements of the user can be met. In the case that the rate, bandwidth and interference are known, the value of signal power may also be calculated through the Shannon formula, C=B log (1+SNR). These are well-known techniques for the skilled person in the art, which will not be repeated herein.

Figure 3:
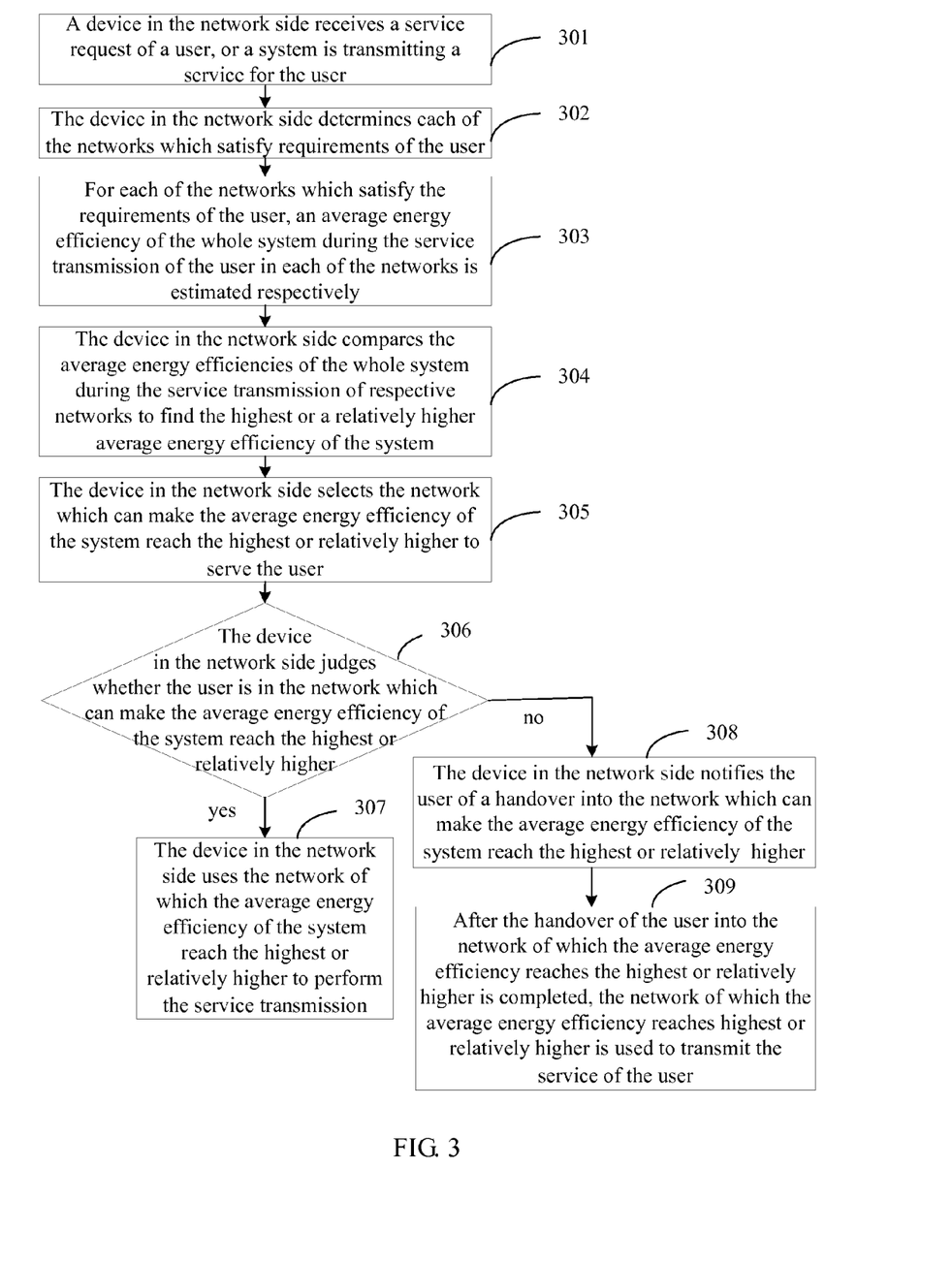
FIG. 3 is a flowchart of an application example of a network selection method provided by the embodiments of the present invention.

Referring to FIG. 3, which is a flowchart of an application example of a network selection method provided by the present invention, and the method includes:

Step 301: A device on the network side receives a service request of a user, or a system is transmitting a service for the user.

Step 302: The device on the network side determines each of the networks which satisfy requirements of the user.

In other words, user information may be first obtained, and then it is determined whether each of the networks satisfies the requirements of the user according to the user information. Where the user information may include QoS requirements, and may also include position and/or service type. The QoS requirements may include one or more of the followings: rate requirements, delay restrictions, and so on.

Step 303: For each of the networks which satisfy the requirements of the user, an average energy efficiency of the whole system during the service transmission of the user in each of the networks is estimated respectively.

The specific calculation method of the average energy efficiency refers to the above corresponding implementation process, which will not be repeated herein.

Step 304: The device on the network side compares the average energy efficiencies of the whole system during the service transmission of respective networks to find the highest or a relatively higher average energy efficiency of the system.

Step 305: The device on the network side selects the network which can make the average energy efficiency of the system reach the highest or relatively higher to serve the user.

Step 306: The device on the network side judges whether the user is in the network which can make the average energy efficiency of the system reach the highest or relatively higher; if yes, then step 307 is performed; otherwise, step 308 is performed.

Step 307: The device on the network side uses the network of which the average energy efficiency of the system reach the highest or relatively higher to perform the service transmission.

Step 308: The device on the network side notifies the user of a handover into the network which can make the average energy efficiency of the system reach the highest or relatively higher.

Step 309: After the handover of the user into the network of which the average energy efficiency reaches the highest or relatively higher is completed, the network of which the average energy efficiency reaches highest or relatively higher is used to transmit the service of the user.

In this embodiment of the present invention, the energy efficiency (referred to as energy efficiency) of the system is taken as one of the bases of network selection, the networks that meet the requirements of the user are determined, the average energy efficiency of the system during the service transmission after the user accesses each of the networks is estimated, and the network of which the average energy efficiency is high is selected to serve the user, thus the purpose for energy saving of the system is achieved.

In this embodiment of the present invention, under the premise of meeting the current requirements of the user, the network of which the average energy efficiency of the system reaches the highest or relatively higher is selected to serve the user, thus the energy consumption of the system is reduced, and the energy efficiency of the system is improved.

Figure 4:
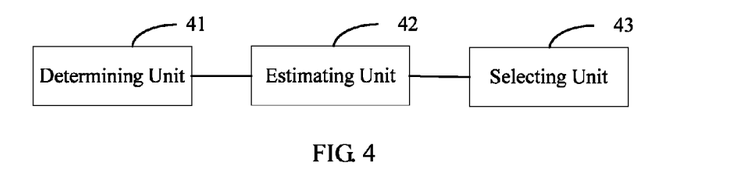
FIG. 4 is a schematic structural diagram of a network selection apparatus provided by the embodiments of the present invention.

Based on the implementation process of the method described above, embodiments of the present invention further provide a network selection apparatus, of which the structure diagram is shown in FIG. 4, the apparatus includes: a determining unit 41, an estimating unit 42 and a selecting unit 43, where the determining unit 41 is configured to determine each of networks which satisfy requirements of a user when the user initiates a service or transmits a service; the estimating unit 42 is configured to estimate average energy efficiency of the system during the service transmission after the user selects to access each of the networks; and the selecting unit 43 is configured to select a network which can make the average energy efficiency of the system reach a preset threshold value to serve the user.

Optionally, in another embodiment, this embodiment is based on the above-described embodiment, and the apparatus may further include: a judging unit and a first transmitting unit, where:

the judging unit is connected with the selecting unit, and configured to judge whether the user is in the network of which the average energy efficiency reaches the preset threshold value;

the first transmitting unit is configured to use the network of which the average energy efficiency reaches the preset threshold value to transmit the service of the user, after the judging unit judges that the user is in the network which can make the average energy efficiency reach the preset threshold value.

Optionally, in another embodiment, this embodiment is based on the above-described embodiments, and the apparatus may further include: a notification unit and a second transmitting unit, where:

the notification unit is configured to notify the user of a handover into the network which can make the average energy efficiency of the system reach the preset threshold value, after the judging unit judges that the user is not in the network which can make the average energy efficiency of the system reach the preset threshold value;

the second transmitting unit is connected with the notification unit, and configured to use the network of which the average energy efficiency of the system reaches the preset threshold value to transmit the service of the user after the handover of the user into the network which can make the average energy efficiency of the system reach the preset threshold value is completed.

Optionally, in another embodiment, this embodiment is based on the above-described embodiments, where the estimating unit specifically estimates the average energy efficiency of the system during the service transmission after the user accesses each of the networks through the method of system energy efficiency prediction or network energy efficiency prediction.

The estimating unit, which estimates the average energy efficiency of the system during the service transmission after the user accesses each of the networks through the method of system energy efficiency prediction, includes: an information obtaining unit, an information selecting unit, an information estimating unit, and a first calculating unit, where the information obtaining unit is configured to obtain the throughput and power information of each network in each transmission time interval (TTI); the information selecting unit is configured to select the throughput and power information during a first transmission time period; the information estimating unit is configured to estimate the throughput and power information of each network during a second transmission time period of the user, according to the selected throughput and power information; and the first calculating unit is configured to calculate respectively the average energy efficiency of the service transmission of the system in the second transmission time period of the user after the user selects to access each of the networks, according to the throughput and power information estimated by the information estimating unit.

The estimating unit, which estimates the average energy efficiency of the system during the service transmission after the user selects to access each of the networks through the method of network energy efficiency prediction, includes: a second obtaining unit, a searching unit and a second calculating unit, where the second obtaining unit is configured to obtain a signal to interference plus noise ratio of the user, and a load of each network; the searching unit is configured to search in a preset network energy efficiency table according to the signal to interference plus noise ratio of the user, and the load of each network obtained by the second obtaining unit, to get the energy efficiency of each network; the second calculating unit is configured to calculate the average energy efficiency of the system during the service transmission after the user accesses each of the networks of which the energy efficiency is the highest or relatively higher.

The implementation process of the function and the effect of each unit in the apparatus refer to the implementation process of corresponding steps in the above method, which will not be repeated herein.

Figure 5:
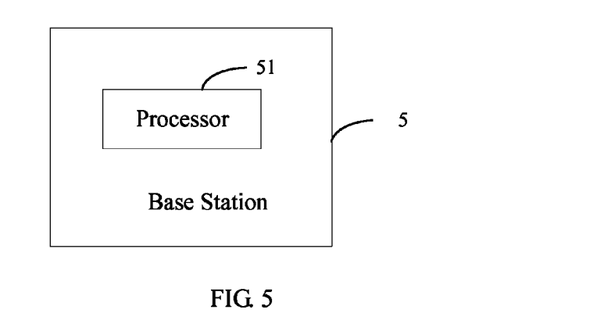
FIG. 5 is a schematic structural diagram of a base station provided by the embodiments of the present invention.

Accordingly, embodiments of the present invention further provide a base station, of which a structure diagram is shown in FIG. 5. The base station includes: a processor 51, configured to determine each of networks satisfying requirements of a user when the user initiates a service or transmits a service; estimate an average energy efficiency of a system during the service transmission after the user selects to access each of the networks; and select a network which can make the average energy efficiency of the system reach a preset threshold value to serve the user.

Optionally, the processor is further configured to judge whether the user is in the network of which the average energy efficiency reaches the preset threshold value. The base station further includes a transceiver, and the transceiver is configured to use the network of which the average energy efficiency reaches the preset threshold value to transmit the service of the user, after the processor judges that the user is in the network of which the average energy efficiency reaches the preset threshold value; or to notify the user of a handover into the network of which the average energy efficiency reaches the preset threshold value, after the processor judges that the user is not in the network of which the average energy efficiency reaches the preset threshold value, and after the handover of the user into the network of which the average energy efficiency reaches the preset threshold value is completed, use the network of which the average energy efficiency reaches the preset threshold value to transmit the service of the user.

Optionally, the processer estimates the average energy efficiency of the system during the service transmission after the user selects to access each of the networks through the method of system energy efficiency prediction or network energy efficiency prediction.

The processer estimates the average energy efficiency of the system during the service transmission after the user selects to access each of the networks through the method of system energy efficiency prediction, includes that:

obtains the throughput and power information of each network in each transmission time interval (TTI); selects the throughput and power information during a first transmission time period; estimates the throughput and power information of each network during a second transmission time period of the user according to the selected throughput and power information; and calculates respectively the average energy efficiency of the service transmission of the system in the second transmission time period of the user after the user selects each of the networks, according to the estimated the throughput and power information.

Optionally, the transceiver is further configured to obtain a signal to interference plus noise ratio of the user, and a load of each network. The processer estimates the average energy efficiency of the system during the service transmission after the user selects to access each of the networks through the method of network energy efficiency prediction, includes: searches in a preset network energy efficiency table according to the signal to interference plus noise ratio of the user, and the load of each network, to get the energy efficiency of each network; calculates the average energy efficiency of the system during the service transmission after the user selects to access each of the networks of which the energy efficiency is the highest or relatively higher.

The implementation processes of the functions and the effects of the transceiver and the processor in the base station refer to the implementation process of corresponding steps in the above method, which will not be repeated herein.

In order to facilitate the understanding for person skilled in the art, the following explains with a specific system simulation example.

In this system simulation example, taking a system, in which there are two networks, UMTS and LTE, as an example. The specific parameters are shown in Table 2, and Table 2 is a table of system simulation parameters.

TABLE 2

| Parameter/Value | UMTS | LTE |
|---|---|---|
| System Bandwidth | 5 M | 20 M |
| Antenna Configuration | 1*1 | 2*2 |
| Packet Scheduler | PF-QoS | PF-QoS |
| Propagation Scenario | cell number = 1; interference cell = 6 | |
| LTE Penetration Level | 100% | |
| Traffic Model | VoIP, FTP, WWW, Video | |
| RAT Selection Algorithm | RA, PBLA, ULA, UTA, IEEBA, AEEBA, TTBA | |

The system is assumed as:

(1) the base stations in both formats of UMTS and LTE share a same site location and a same coverage.

(2) the cell is in regular hexagon, and the users are evenly distributed within the cell.

(3) the carrier frequency is 1.8 GHz.

(4) Static power of LTE base station=50 w

Max transmission power of LTE base station=40 w

Max transmission power per antenna in LTE=20 w

Static power of High-Speed Packet Access, HSPA, base station (Static power of HSPA base station)=50 w Max transmission power of HSPA base station=20 w Service types and proportions: in the simulation system, the four service types commonly used are: VoIP, FTP, WWW and Video, and the proportions of the four service types are shown in Table 3. Table 3 is a table for the four service types and their proportions in the simulation system.

TABLE 3

| service type | proportion |
|---|---|
| VoIP | 5% |
| FTP | 20% |
| WWW | 20% |
| Video | 55% |

In the network selection of the embodiments of the present invention, the following algorithms are used in the simulation, but they are not limited thereto:

(1) RA-Random Algorithm: the probabilities for all the users to access UMTS and to access LTE are both 50%.

(2) PBLA-Push to Best Layer Algorithm: bandwidths of UMTS and LTE are 5 MHz, 20 MHz respectively. Assuming the maximum capacities of the UMTS and LTE systems are 14.4M bps and 100M bps respectively, according to the ratio of the maximum capacities. It is set that the probability of selecting the UMTS by the user is 12.59%, and the probability of selecting the LTE is 87.41%.

(3) ULA-User Load Algorithm: network selection is performed according to the current service load of the UMTS and LTE, and the network with the lower load is accessed.

(4) UTA-User Throughput Algorithm: the selection is performed according to the current throughput that the UMTS and LTE can provide, and the network which can provide larger throughput is accessed.

(5) IEEBA-Instant Energy Efficiency based Algorithm: the selection is performed according to the instant energy efficiency of the network, and the network with the greater instant energy efficiency is accessed.

(6) AEEBA-Average Energy Efficiency based Algorithm: the selection is performed according to the average energy efficiency of the network, and the network with the greater average energy efficiency is accessed.

(7) TTBA1-Traffic Type based Algorithm: the selection is performed according to the service type, users of VoIP are made to access the UMTS, and users of other service types access the LTE.

(8) TTBA2-Traffic Type based Algorithm: the users of FTP are made to access the LTE, and users of other service types are made to select randomly (probabilities of accessing the UMTS and LTE are both 50%).

The above eight kinds of algorithms are well known techniques for the skilled person in the art, which will not be described herein.

the number of users:

| | |
|---|---|
| VoIP | 10 |
| FTP | 40 |
| WWW | 40 |
| Video | 110 |

The simulation results are shown in Table 4, where Table 4 is the simulation results of different network selection methods.

TABLE 4

| Algorithm | Total throughput (Mbits) | Total energy (KJoule) | Energy efficiency (kbits/Joule) |
|---|---|---|---|
| RA | 931.618 | 7.37 | 126.36 |
| PBLA | 1489.166 | 7.55 | 197.20 |
| ULA | 1529.802 | 7.80 | 196.17 |
| UTA | 1465.480 | 6.35 | 230.91 |
| IEEBA | 1470.758 | 6.37 | 230.99 |
| AEEBA | 1470.657 | 6.37 | 230.97 |
| TTBA1 | 1474.641 | 6.61 | 223.25 |
| TTBA2 | 1510.225 | 7.45 | 202.58 |

Figure 6:
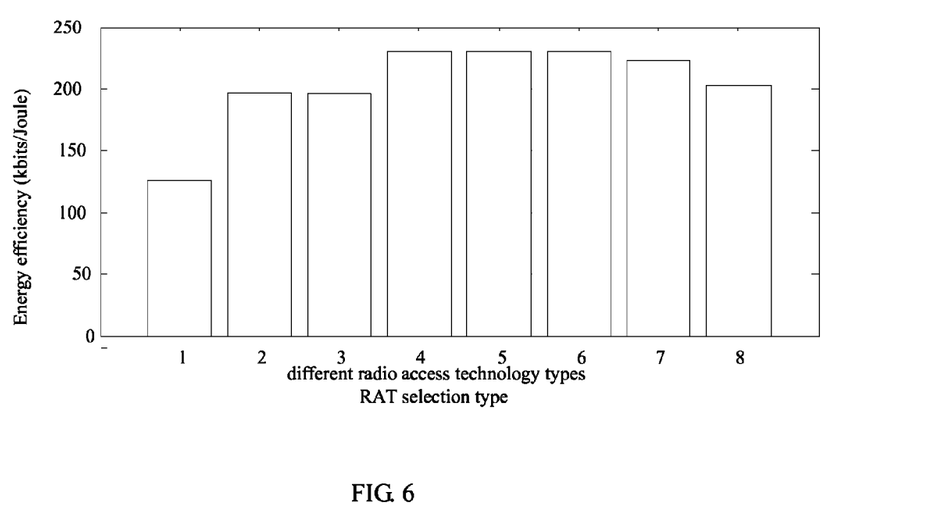
FIG. 6 is a schematic diagram of energy efficiencies of different network selection solutions provided by the embodiments of the present invention.
Figure 7:
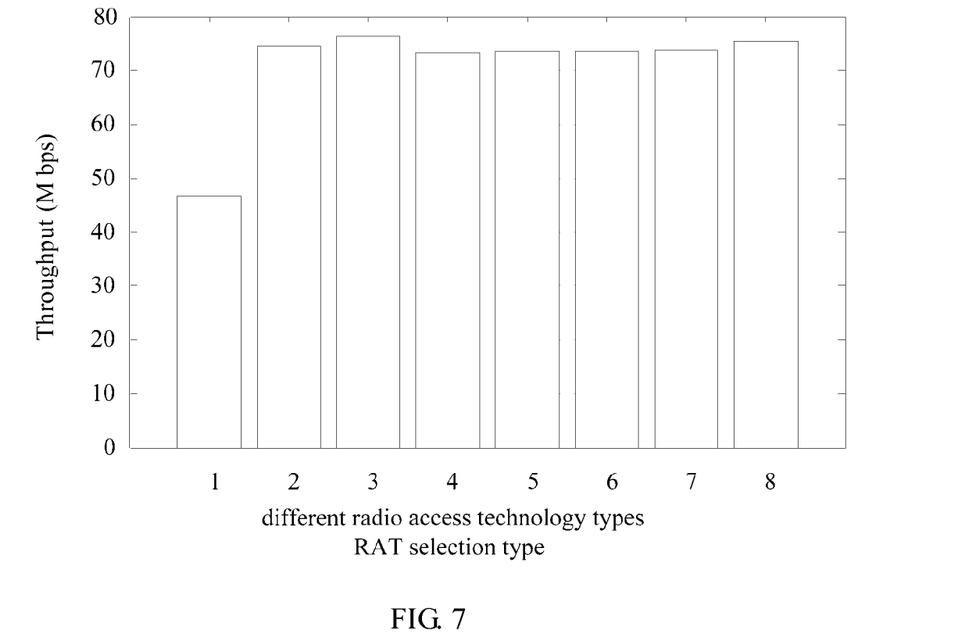
FIG. 7 is a schematic diagram of throughputs of different network selection solutions provided by the embodiments of the present invention.

In Table 4, the corresponding energy efficiencies and the corresponding throughputs of different radio access technology types respectively refer to FIG. 6 and FIG. 7. FIG. 6 is a schematic diagram of energy efficiencies of different network selection solutions provided by the embodiments of the present invention. FIG. 7 is a schematic diagram of throughputs of different network selection solutions provided by the embodiments of the present invention.

As shown in FIG. 6, the horizontal axis is the selected different radio access technology types (RAT selection type), and the vertical axis represents the energy efficiencies, Energy efficiency (kbits/Joule), corresponding to different radio access technology types.

As shown in FIG. 7, the horizontal axis is the selected different radio access technology types (RAT selection type), and the vertical axis represents the throughputs, Throughput (M bps), corresponding to different radio access technology types.

In FIG. 6 and FIG. 7, 1 represents RA, 2 represents PBLA, 3 represents ULA, 4 represents UTA, 5 represents IEEBA, 6 represents AEEBA, 7 represents TTBA1, and 8 represents TTBA2.

As can be seen from FIG. 6 that, the energy efficiencies of IEEBA, AEEBA and UTA are obviously higher than those of the network selection solutions of TTBA1, TTBA2, RA, PBLA and ULA. Therefore, selecting the right network solution is very important for improving the energy efficiency of the system. And, as can be seen from FIG. 7, the throughputs of IEEBA, AEEBA and UTA are also good. As for ULA and TTBA2, although the throughputs thereof are high, the energy efficiencies thereof are not very satisfactory. In addition, from the difference between the energy efficiencies of TTBA1 and TTBA2, it can be seen that, how to shunt the service types and letting which service type access the LTE have a great impact on the network selection based on service type.

In the embodiments of the present invention, the UE may be any one of the followings, may be static, may also be mobile, the static UE may specifically include terminal, mobile station, subscriber unit, or station, and so on; the mobile UE may specifically include cellular phone, personal digital assistant (PDA), wireless modem (modem), wireless communication device, handheld device (handheld), laptop computer, cordless phones or wireless local loop (WLL) station, and so on. The UE may be distributed throughout the wireless network.

It should be noted that, in this description, relational terms such as first and second and the like, are only used to distinguish one entity or one operation from another entity or another operation, and do not necessarily require or imply the actual existence of any such relationship or order between these entities or operations. Moreover, the term "include", "contain", or any other variation thereof, is intended to cover a non-exclusive inclusion, so that the process, method, article or device which includes a series of elements, not only includes these elements, but also includes other elements not expressly listed, or further includes elements inherent in such process, method, article or device. In the absence of further restrictions, the element defined by the statement "includes a" does not exclude the same element that exists in the process, method, article or device which includes the foregoing elements.

With the description of the foregoing embodiments, persons of ordinary skill in the art may clearly understand that the present invention may be implemented in the form of software with necessary common hardware platform, of course, may also through hardware, but in most cases, the former is the better implementation. Based on this understanding, the technical solutions of the present invention or the part which contributes to the prior art may be reflected in the form of software products, the computer software product may be stored in a storage medium such as a ROM/RAM, a magnetic disk, or an optical disk, including several instructions which make a computer device (may be a personal computer, a server, or a network device and so on) perform the method of each embodiment or certain parts of the embodiment.

The above descriptions are merely the preferred implementations of the present invention. It is noted that, for persons ordinary skilled in the art, a certain number of improvements and modifications can be made without departing from the principle of the present invention, and such improvements and modifications are also deemed to be the protection scope of the present invention.

What is claimed is:

1. A network selection method, comprising:
    determining, by a device on a network side, at least one network satisfies a service requirement for a user equipment;
    estimating, by the device on the network side, an average energy efficiency of a system during service transmission after the user equipment selects to access a network, wherein the UE accesses each of the at least one network; and
    selecting, by the device on the network side, the network where the average energy efficiency of the system will reach a preset threshold value to serve the user equipment;
    wherein the estimating the average energy efficiency of the system during the service transmission after the user equipment selects to access at least one network comprises:
    obtaining a signal to interference plus noise ratio of the user equipment and a load of each of the at least one network:
    searching in a preset network energy efficiency table according to the signal to interference plus noise ratio of the user equipment and the load of each of the at least one network, to get the energy efficiency of each of the at least one network; and
    calculating the average energy efficiency of the system during the service transmission after the user equipment selects to access each of the at least one network of which the energy efficiency is the highest or relatively higher.

2. A network selection apparatus, comprising:
    a determining unit, configured to determine at least one network that is capable of satisfying a service requirement for a user equipment;
    an estimating unit, configured to estimate an average energy efficiency of a system during service transmission after the user equipment selects to access at least one network, wherein the UE accesses each of the at least one network;
    a selecting unit, configured to select a network where the average energy efficiency of the system will reach a preset threshold value to serve the user equipment;
    wherein the estimating unit comprises:
    a second obtaining unit, configured to obtain a signal to interference us noise ratio of the user equipment, and a load of each network;
    a searching unit, configured to search in a preset network energy efficiency table according to the signal to interference plus noise ratio of the user equipment, and the load of each of the at least one network, to net the energy efficiency of each of the at least one network; and
    a second calculating unit configured to calculate the average energy efficiency of the system during the service transmission after the user equipment selects to access each of the at least one network of which the energy efficiency is the highest or relatively higher.

3. A base station, comprising:
    a processor, configured to determine at least one network that is capable of satisfying a service requirement for a user equipment; estimate an average energy efficiency of a system during the service transmission, after the user equipment selects to access at least one network, wherein the UE accesses each of the at least one network; and select a network where the average energy efficiency of the system will reach a preset threshold value to serve the user equipment;
    the base station further comprising:
    a transceiver, configured to obtain a signal to interference plus noise ratio of the use equipment and a load of each of the at least one network;
    wherein the processor configured to estimate the average energy efficiency of the system during the service transmission after the user equipment selects to access each of the at least one network through the method of network energy efficiency prediction, comprises:
    the processer configured to search in a preset network energy efficiency table according to the signal to interference plus noise ratio of the user equipment, and the load of each of the at least one network, to net the energy efficiency of each of the at least one network; calculates the average energy efficiency of the system during the service transmission after the user equipment selects to access each of the at least one network of which the energy efficiency is the highest or relatively higher.

4. A network selection method performed by a device on a network side, comprising:
    receiving a request from a user equipment (UE) for a service;
    determining a list of networks that satisfy the requirements of the request;
    obtaining a signal to interference plus noise ratio of the UE and a load of each of the networks that satisfy the requirements of the request;
    searching a network energy efficiency table according to the signal to interference plus noise ratio to get the energy efficiency of each network;
    calculating the average energy efficiency of the system during the service transmission after the UE accesses each of the networks; and
    selecting a network based on the average energy efficiency calculation.

5. The method according to claim 4, wherein the calculating step comprises:
    calculating the average energy efficiency of the system during the service transmission after the E accesses each of the networks based on a method of system energy efficiency prediction or network energy efficiency prediction.

6. The method according to claim 5, wherein the calculating step based on the method of system energy efficiency prediction comprises:
    obtaining a throughput and power information of each network in each transmission time interval (TTI);
    selecting the throughput and power information during a first transmission time period, the first transmission time period comprises at least one TTI;

estimating a throughput and power information of each network during a second transmission time period of the UE, according to the selected throughput and power information; and calculating respectively the average energy efficiency of the service transmission of the system in the second transmission time period of the UE after the UE selects to access each network, according to the estimated throughput and power information.

* * * * *

UNITED STATES PATENT AND TRADEMARK OFFICE
CERTIFICATE OF CORRECTION

PATENT NO. : 9,872,253 B2
APPLICATION NO. : 14/859217
DATED : January 16, 2018
INVENTOR(S) : Liu et al.

Page 1 of 1

It is certified that error appears in the above-identified patent and that said Letters Patent is hereby corrected as shown below:

In the Claims

Column 19, Line 58 "interference us noise" should read -- interference plus noise --.

Column 19, Line 63 "to net the energy efficiency" should read -- to get the energy efficiency --.

Column 20, Line 17 "use equipment" should read -- user equipment, --.

Column 20, Line 27 "to net the energy efficiency" should read -- to get the energy efficiency --.

Column 20, Line 56 "the E accesses" should read -- the UE accesses --.

Signed and Sealed this
Fifteenth Day of May, 2018

Andrei Iancu
*Director of the United States Patent and Trademark Office*